US012684676B2

(12) United States Patent
Klein

(10) Patent No.: US 12,684,676 B2
(45) Date of Patent: Jul. 14, 2026

(54) SMART ADAPTER FOR OUTDOOR LIGHTING SYSTEMS

(71) Applicant: RACHIO, INC., Denver, CO (US)

(72) Inventor: Christopher M. Klein, Denver, CO (US)

(73) Assignee: RACHIO, INC., Denver, CO (US)

( * ) Notice: Subject to any disclaimer, the term of this patent is extended or adjusted under 35 U.S.C. 154(b) by 95 days.

(21) Appl. No.: 18/596,389

(22) Filed: Mar. 5, 2024

(65) Prior Publication Data

US 2024/0306281 A1 Sep. 12, 2024

Related U.S. Application Data

(60) Provisional application No. 63/450,294, filed on Mar. 6, 2023.

(51) Int. Cl.
*H05B 47/175* (2020.01)

(52) U.S. Cl.
CPC ................................ *H05B 47/1985* (2024.01)

(58) Field of Classification Search
CPC .......................... H05B 47/1985; H05B 47/105
See application file for complete search history.

(56) References Cited

U.S. PATENT DOCUMENTS

| | | | | |
|---|---|---|---|---|
| 10,178,747 | B1 * | 1/2019 | Rivera | F21S 10/02 |
| 10,995,936 | B1 * | 5/2021 | Breedlove | H05B 47/16 |
| 2007/0273307 | A1 * | 11/2007 | Westrick | H05B 47/16 315/312 |
| 2009/0278473 | A1 * | 11/2009 | Van Erp | H05B 47/185 315/307 |
| 2015/0084515 | A1 * | 3/2015 | Altamura | H05B 45/20 315/131 |

* cited by examiner

*Primary Examiner* — Minh Tran
(74) *Attorney, Agent, or Firm* — Dorsey & Whitney LLP

(57) ABSTRACT

A method of activating a lighting system including grouping a plurality of lights into two or more lighting zones, wherein the plurality of lights are coupled to a power controller, coupling the two or more lighting zones to a bypass controller, wherein the two or more lighting zones are configured to be actuated together or separately, and activating at least one of the two or more lighting zones via the bypass controller.

20 Claims, 3 Drawing Sheets

SMART ADAPTER FOR OUTDOOR LIGHTING SYSTEMS

CROSS-REFERENCE TO RELATED APPLICATIONS

This application claims priority under 35 U.S.C. § 119 to U.S. Provisional Application No. 63/450,294, entitled "Smart Adapter for Outdoor Lighting Systems," filed Mar. 6, 2023, which is hereby incorporated by reference herein in its entirety for all intents and purposes.

FIELD

The present disclosure relates generally to lighting systems, such as those used for landscape or other outdoor uses.

BACKGROUND

Many home and business owners utilizing lighting systems to illuminate various areas of the property. For example, people may include pathway lights that illuminate walkways to and from the street or around the property, aesthetic lights that illuminate various plants or other landscaped areas, or the like. Typically, such lighting systems utilizing a single transformer that powers the lights on or off via a power wire that connects the different lighting systems together. With such systems, however, the lights are turned on or off together, which reduces the flexibility and aesthetic options for a particular property.

SUMMARY

In one embodiment, a method of activating a lighting system is disclosed. The method includes grouping a plurality of lights into two or more lighting zones, where the plurality of lights are coupled to a power control, coupling the two or more lighting zones to a bypass controller, where the two or more lighting zones are configured to be actuated together or separately, and activating at least one of the two or more lighting zones via the bypass controller.

In one example, a system for activating a plurality of outdoor lights is disclosed. The system includes a power controller electrically coupled to a power source and to the plurality of outdoor lights and a bypass controller coupled between the plurality of outdoor lights and the power controller.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present disclosure as defined in the claims is provided in the following written description of various embodiments of the claimed subject matter and illustrated in the accompanying drawings.

Figure 1:
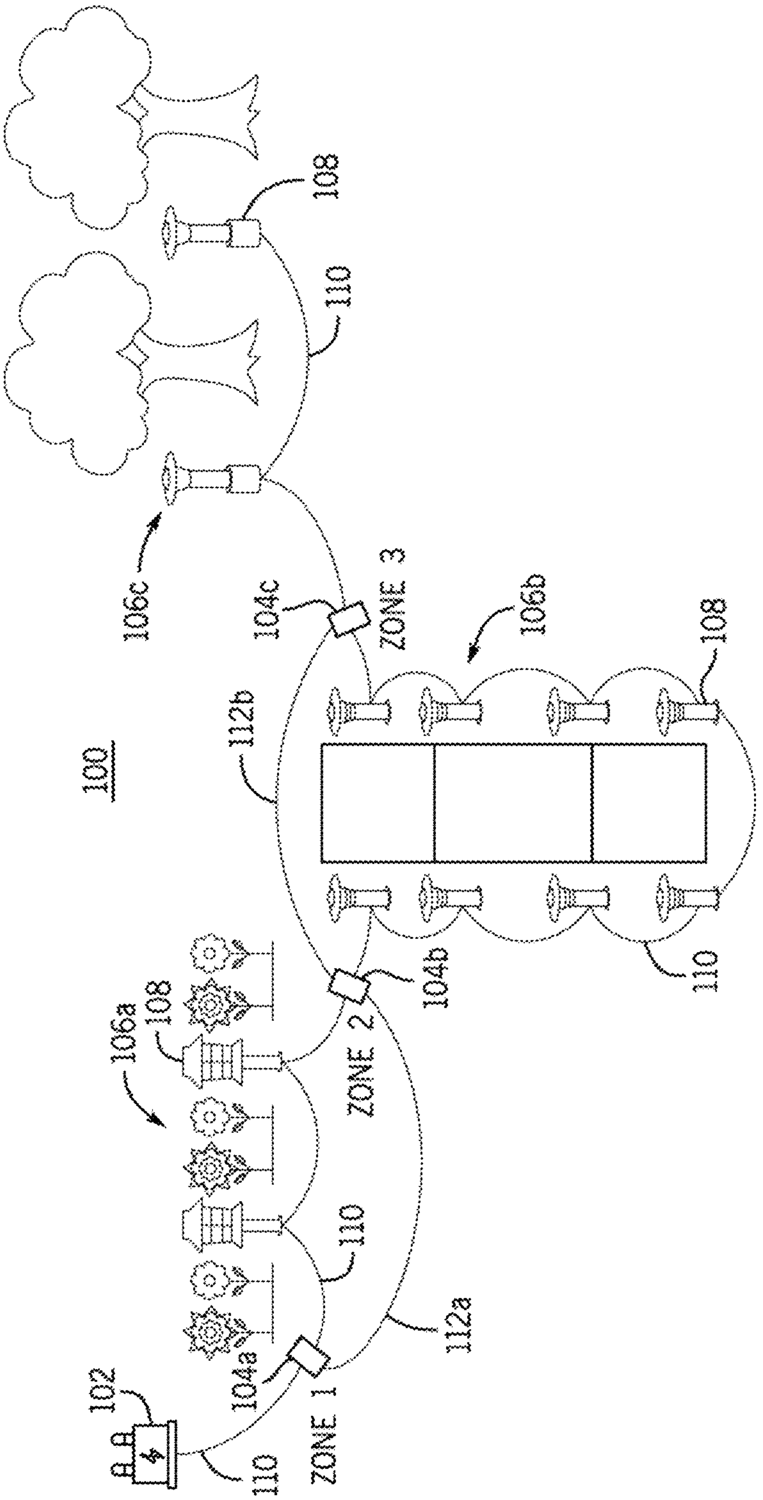
FIG. 1 illustrates a lighting system including a bypass controller.

This Brief Description of the Drawings is provided to introduce a selection of concepts in a simplified form that are further described below in the Detailed Description. This Brief Description of the Drawings is not intended to identify key features or essential features of the claimed subject matter, nor is it intended to be used to limit the scope of the claimed subject matter. A more extensive presentation of features, details, utilities, and advantages of the present disclosure as defined in the claims is provided in the following written description of various embodiments of the claimed subject matter and illustrated in the accompanying drawings.

DETAILED DESCRIPTION

The present disclosure relates generally relates to a system and method for selectively activating one or more lights, such as lights positioned in and around an outdoor area, such as landscape lighting for businesses, homes, and other properties. In one example, the system includes a power controller electrically coupled to a power source and to the lights, where the power controller is configured to provide power to the lights. A bypass controller or bypass module is coupled between the power controller and one more groups of lights and configured to selectively pass through power from the power controller to activate the lights, while also provide a separate electrical path to downstream lights or zones. For example, when a first set of lights is desired to be activated, a user can activate the bypass controller to enable power from the power controller to be delivered to the first set of lights. However, when the first set of lights is desired to be deactivated, the user can instructed the bypass controller to turn off the first set of lights, and the bypass controller will terminate electricity from the power controller to the first set of lights. The bypass power route (e.g., bypass power line or wire) then may provide power to downstream lights, but not to the identified lights. In this manner, lights along any location of the power circuit can be activated or deactivated, without impacting the ability of other lights to be activated or deactivated. This allows independent control of different lighting zones, all of which may be coupled to the same power controller or power source.

In many embodiments, there may be multiple bypass controllers positioned at different positions along a lighting circuit, e.g., all of the lights on the lighting circuit may be coupled (e.g. in series) to the power controller, but the bypass controller may be positioned between the connection to prevent or enable electricity to select groups of lights, even groups of lights within the middle of the circuit, without deactivating lights on further on the circuit. Conventional outdoor lighting systems require separate, decoupled circuits, to allow different sets of lights to be activated, which can require different controllers and multiple different connections or wires to the different lights. Further, some outdoor lighting controllers may enable a spliced wire at the end of a lighting circuit to allow a set of lights at the end of the circuit to be powered on or off selectively, but this configuration requires that the first set of lights (e.g., those before the splice) always be activated in order for the configurable lights to be activated. On the contrary, the current system allows a user to set up and selectively activate various groupings or zones of lights, which can be turned on or off without regard to the state of other lights (e.g., those positioned upstream from the lights to be activated). Such configurability and flexibility allows users to have full control of the lighting system and provide various aesthetic effects not possible with conventional lighting systems. Further the system described herein can be used with legacy lighting systems and power controllers that enable configurability without requiring wholesale replacement of the system.

FIG. 1 illustrates an example of a lighting system 100. The lighting system 100 includes a power controller 102 coupled to a power source (e.g. wall outlet, battery, etc.) and is configured to provide power to one or more lights 108. For example, the power controller 102 may be electrically coupled to the lights 108 via a power wire 110 that may extend from the controller 102 to the lights 108 to define a lighting circuit, e.g., a series connection, such that each of the lights 108 on the circuit may receive power from the controller 102.

The lights 108 may be lighting elements configured to generate light (e.g., light emitting diodes) or the like and may be configured for outdoor use, e.g., configured to withstand the environmental elements. In many examples, the lights 108 may be landscape lights and configured as pathway lights, spotlights, or the like. The lights 108 may include a housing and optional optical elements (e.g., lenses) to focus or vary the emitted light as desired.

One or more bypass controllers, such as a first bypass controller 104*a*, a second bypass controller 104*b*, and a third bypass controller 104*c*, may be coupled between the power controller 102 and one or more lights 108. The bypass controllers 104*a*, 104*b*, 104*c* may be configured to define bypass paths 112*a*, 112*b* (e.g., a bypass wire or other electrical connection) from the power controller 102 to different or downstream lighting zones, such as a first lighting zone 106*a*, a second lighting zone 106*b*, and a third lighting zone 106*c*.

For example, the first bypass controller 104*a* may provide power supplied by the power controller 102 to the first bypass wire 112*a*, instead of to the power wire 110 coupled to the lights 108 of the first lighting zone 106*a*. The first bypass wire 112*a* may define a bypass path from the power controller 102 or the first bypass controller 104*a* to the second bypass controller 104*b*, thereby "bypassing" the first lighting zone 106*a*. In this example, the power supplied by the power controller 102 may proceed directly to the second lighting zone 106*b* and in response, the lights 108 of the second lighting zone 106*b* may generate light. In this example, the third bypass controller 104*c* may receive power from the power wire 110 coupled with the lights 108 of the second lighting zone 106*b*. The third bypass controller 104*c* may permit the power supplied by the power controller 102 to also pass to the lights 108 of the third lighting zone 106*c* and in response, the lights 108 of the third lighting zone 106*c* may generate light. In other examples, the third bypass controller 104*c* may inhibit the power supplied by the power controller 102 to pass to the lights 108 of the third lighting zone 106*c* such that only the lights 108 of the second lighting zone 106*b* are configured to generate light.

Additionally in another example, the first bypass controller 104*a* may provide power supplied by the power controller 102 to the first bypass wire 112*a*, instead of to the power wire 110 coupled to the lights 108 of the first lighting zone 106*a*; and the second bypass controller 104*b* may provide the power to the second bypass wire 112*b*, instead of to the power wire 110 coupled to the lights 108 of the second lighting zone 106*b*. The first bypass wire 112*a* may define a path from the power controller 102 or the first bypass controller 104*a* to the second bypass controller 104*b*, thereby "bypassing" the first lighting zone 106*a*, and the second bypass wire 112*b* may define a bypass path from the second bypass controller 104*b* to the third bypass controller 104*c*, thereby "bypassing" the second lighting zone 106*b*. In this example, the power supplied by the power controller 102 may proceed directly to the third lighting zone 106*c* and in response, the lights 108 of the third lighting zone 106*c* may generate light.

In yet another example, the first bypass controller 104*a* may supply power from the power controller 102 to the lights 108 of the first lighting zone 106*a* via the power wire 110 and to the second bypass controller 104*b*. The second bypass controller 104*b* may provide the power to the second bypass wire 112*b*, instead of to the power wire 110 coupled to the lights 108 of the second lighting zone 106*b*, thereby "bypassing" the second lighting zone 106*b*. In this example, the power may proceed to the third bypass controller 104*c*. The third bypass controller 104*c* may provide the power to the lights 108 of the third lighting zone 160*c* via the power wire 110, such that the lights 108 of the first lighting zone 106*a* and third lighting zone 160*c* are configured to generate light. In other example, the third bypass controller 104*c* may inhibit the power supplied by the power controller 102 to pass to the lights 108 of the third lighting zone 106*c*, such that only the lights 108 of the first lighting zone 106*a* are configured to generate light.

In another example, the first bypass controller 104*a* may supply power from the power controller 102 to the lights 108 of the first lighting zone 106*a* via the power wire 110 and to the second bypass controller 104*b*. The second bypass controller 104*b* may provide the power to the lights 108 of the second lighting zone 106*b* via the power wire 110 and to the third bypass controller 104*c*. The third bypass controller 104*c* may provide the power to the lights 108 of the third lighting zone 160*c* via the power wire 110, such that the lights 108 of the first lighting zone 106*a*, the second light zone 106*b*, and the third lighting zone 160*c* are configured to generate light. In other example, the third bypass controller 104*c* may inhibit the power supplied by the power controller 102 to pass to the lights 108 of the third lighting zone 106*c*, such that only the lights 108 of the first lighting zone 106*a* and the second light zone 106*b* are configured to generate light.

The bypass controllers 104*a*, 104*b*, 104*c* may also include a communication module (e.g., WiFi, Bluetooth, Zigbee, or other radio frequency configuration) to allow communication between each other and/or a user device or cloud server. For example, the bypass controllers 104*a*, 104*b*, 104*c* may be configured to receive activation or illumination instructions from a user device (e.g., smartphone, computer, tablet, etc.) and/or other computing element (e.g., the power controller 102, a device hub, network device, etc.).

In some embodiments, the first bypass controller 104*a* may include two communication modules (e.g., a wireless module and a wired module) and the other or secondary bypass controllers 104*b*, 104*c* may include a single communication module (e.g., a wired module). In this manner, the first bypass controller 104*a* may act as a master and the second and third bypass controllers 104*b*, 104*c* may act as repeaters or slaves. However, in other embodiments, the bypass controllers 104*a*, 104*b*, 104*c* may be substantially the same.

The bypass controllers 104*a*, 104*b*, 104*c* may also include an identifier, e.g., a unique identifier, that may help a user identify particular zones and/or allow a user to selectively activate a particular zone via a select bypass controller 104a, 104b, 104c. For example, the bypass controllers 104a, 104b, 104c may include a QR code, image, serial number, or the like, on an outer surface (e.g., a housing) of the bypass controllers 104a, 104b, 104c that can be identified manually by a user and/or automatically by a user device (e.g., scanned or captured in an image). The bypass controllers 104a, 104b, 104c may include parallel wire connections, e.g., a power connection to receive power wire 110 and a bypass connection to receive bypass wire 112a, 112b. The bypass controller 104a, 104b, 104c may include an internal switch, circuit, or other module that can selectively direct power to the bypass wire 112a, 112b or to the power wire 110 depending on the desired activation for the respective lighting zones 106a, 106b, 106c.

With reference to FIG. 1, different groupings or sets of lights 108 may be arranged into different "zones." These lighting zones 106a, 106b, 106c may include one or more lights 108 and be arranged in different areas of the property, e.g., the first lighting zone 106a may be configured to illuminate a garden area, the second lighting zone 106b may be configured to illuminate a path or walkway, and the third lighting zone 106c may be configured to illuminate trees or other larger vegetation. The lighting zones 106a, 106b, 106c may be selected or identified by a user and may all be connected to the same power controller 102 and define a lighting circuit.

The bypass wires 112a, 112b may run parallel to the power wire 110 to provide power in a separate manner (e.g., a bypass route) to downstream zones. In this manner, any combination of zones 106a, 106b, 106c can be powered by the power controller 102, e.g., the third zone 106c can be activated even if the first two zones 106a, 106b are turned off as power may be transferred to via the bypass wires 112a, 112b extending from bypass controllers 104a, 104b. In some examples, the third bypass controller 104c may include a third bypass wire to yet another zone. In other examples, the third bypass controller 104c may include a grounding wire. For example, the third bypass controller 104c may provide power to the grounding wire instead of the power wire 110 coupled with the lights 108 of the third lighting zone 106c, thereby inhibiting the lights 108 of the third lighting zone 106c from generating light.

Figure 2A:
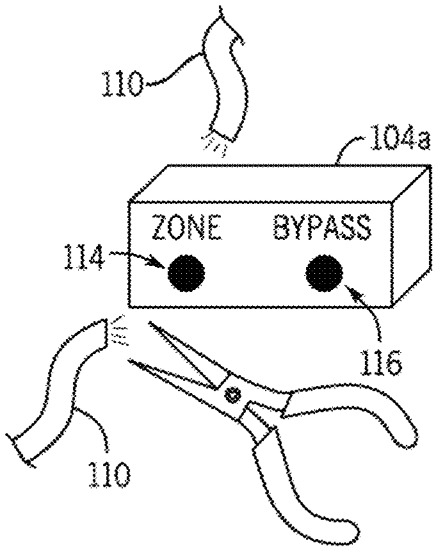
FIG. 2A illustrates a first configuration of installing the bypass controller.
Figure 2B:
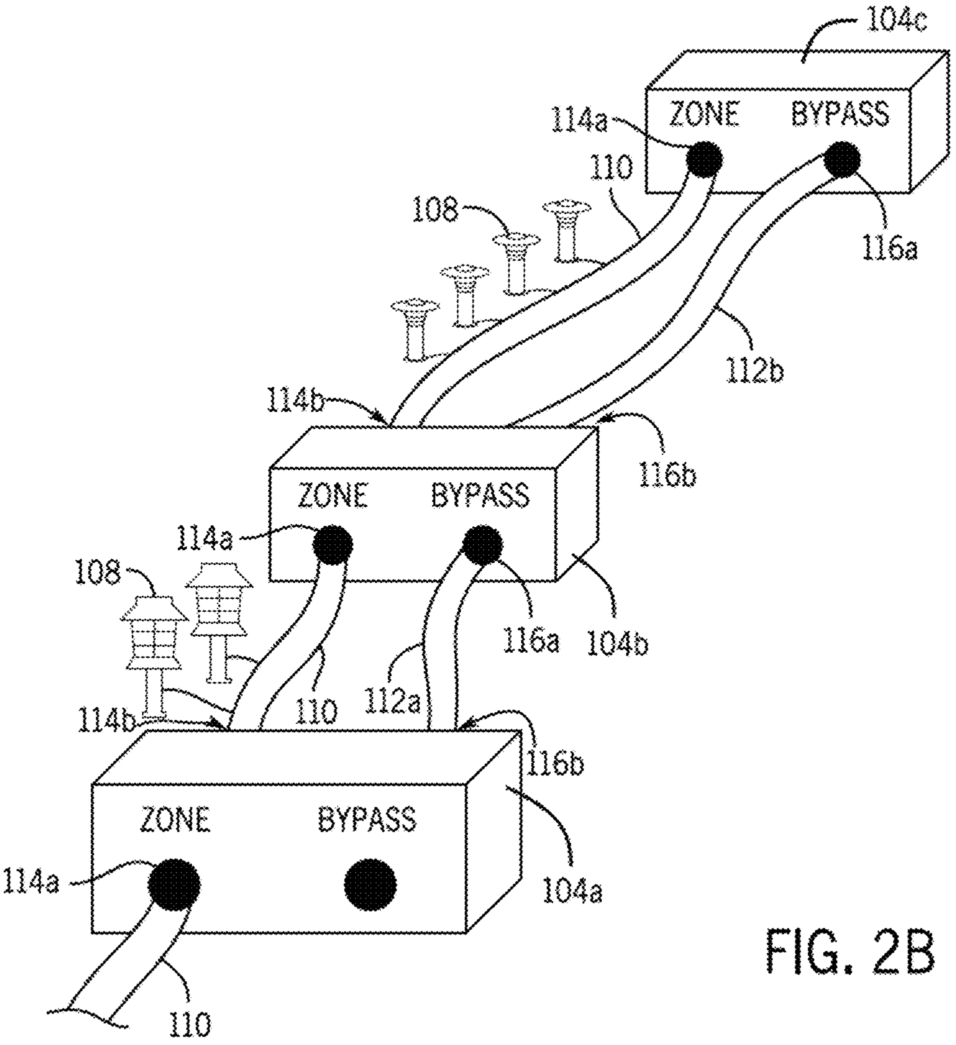
FIG. 2B illustrates a second configuration of the lighting system including the bypass controller.
Figure 2C:
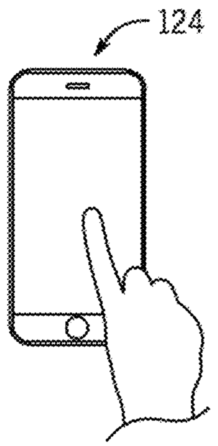
FIG. 2C illustrates a user device for activating the lighting system.

FIGS. 2A-2C illustrate an example of assembling and operating the lighting system 100. Each of the bypass controllers 104a, 104b, 104c may include at least one power connector 114 and at least one bypass connector 116. The power connector 114 of the bypass controllers 104a, 104b, 104c may include or define one or more power ports 114a, 114b, which may electrically couple with one or more wires, such as the power wire 110. The bypass connector 116 of the bypass controllers 104a, 104b, 104c may include or define one or more bypass ports 116a, 116b, which may electrically couple with one or more wires, such as the bypass wires 112a, 112b.

With reference to FIG. 2A, a user can cut, sever, or splice the power wire 110 along its length. The first bypass controller 104a may then be positioned between the two portions of the power wire 110, with the ends of the power wire 110 connected to the power connector 114 (e.g., a first end of the wire 110 connects to a first power port 114a and a second end of the wire connects to a second power port 114b on an opposite side of the bypass controller 104a). In this manner, the first bypass controller 104a is electrically positioned between the ends of the power wire 110 and configured to selectively provide power from the first portion of the power wire 110 to the second portion of the power wire.

With reference to FIG. 2B, the first bypass wire 112a may be coupled to the first bypass controller 104a, e.g., at or via a bypass port 116b, and the other bypass controllers 104b, 104c may be similarly connected. For example, the second bypass controller 104b may be coupled to the power wire 110 (e.g., second and third portions of the wire 110 may connect to a first power port 114a and a second power port 114b, respectively). Additionally, the second bypass controller 104b may be coupled to the first bypass wire 112a, e.g., at or via a first bypass port 116a, and the second bypass wire 112b, e.g., at or via a second bypass port 116b. Similarly, the third bypass controller 104c may be coupled to the power wire 110 (e.g., the third portion of the wire 110 may connect to a first power port 114a and in some examples, a fourth portion of the wire 110 may connect to a second power port). The third bypass controller 104c may be coupled to the second bypass wire 112b, e.g., at or via a first bypass port 116a, and in some examples, the third bypass controller 104c may be coupled a third bypass wire, e.g., at or via a second bypass port.

With reference to FIG. 2C, a user may use a user device 124, such as a smart phone, to identify the lighting zones 106a, 106b, 106c corresponding to the different bypass controllers 104a, 104b, 104c. For example, the user can scan a QR code for the first bypass controller 104a and identify the first lighting zone 106a, e.g., give the first lighting zone 106a a name that can be stored in a database on a cloud server and be used to provide instructions to the bypass controller 104a.

The bypass controllers 104a, 104b, 104c can be positioned between any number of lights 108 and any number of zones 106a, 106b, 106c as may be desired by the user. This allows the user full flexibility in setting different lighting areas to be selectively actuated for different lighting effects or the like. Also, it should be noted that the system 100 can include other sensors or actuators (e.g., motion detectors) that can be used to actuate certain zones 106a, 106b, 106c, or user defined algorithms, instructions, or patterns can be used to actuate the zones 106a, 106b, 106c.

Figure 3:
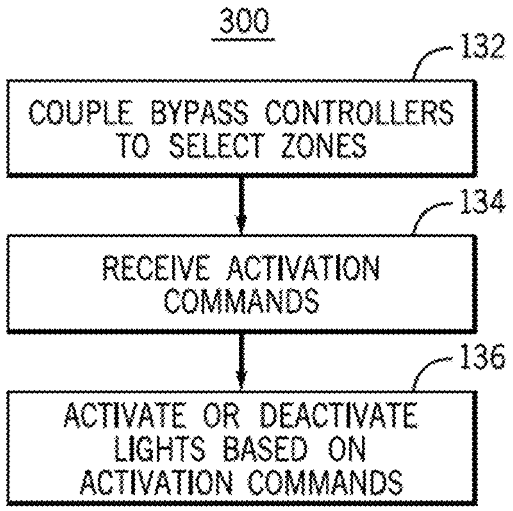
FIG. 3 illustrates a method for activating the lighting system.

With reference to FIG. 3, an example method of activating the light system 100 will now be discussed. The method 300 may begin with operation 132 and electrically coupling the bypass controllers 104a, 104b, 104c to each other and to the selected lights 108 in the various lighting zones 106a, 106b, 106c. For example, as described above with respect to FIGS. 2A-2C, the user may identify desired lights 108 within a particular lighting zone 106a, 106b, 106c. Then, the user or another may connect the bypass controllers 104a, 104b, 104c to the power wire 110 that is coupled to the lights 108 within the lighting zones 106a, 106b, 106c. For example, the user or another may connect a first portion of the power wire 110 to the first power port 114a of the first bypass controller 104a and the second portion of the power wire 110 to the second power port 114b of the first bypass controller 104a. Then the user or another may connect the second portion of the power wire 110 to the first power port 114a of the second bypass controller 104b, and the third portion of the power wire 110 to the second power port 114b of the second bypass controller 104b and to the power port 114a of the third bypass controller 104c. The user or another may connect the bypass controllers 104a, 104b, 104c to each other. For example, the user or another may connect the first bypass wire 112a to the bypass port 116b of the first bypass controller 104a and to the first bypass port 116a of the second bypass controller 104*b*. Then the user or another may connect the second bypass wire 112*b* to the second bypass port 116*b* of the second bypass controller 104*b* and to the bypass port 116*a* of the third bypass controller 104*c*.

In operation 134, activation commands may be received. For example, the user device 124 may provide various activation scenarios or commands to a server or other processor (e.g., lighting hub, communication controller, or the like) that indicates when the identified lighting zones 106*a*, 106*b*, 106*c* should be activated. As an example, the second lighting zone 106*b* may be coupled to a motion sensor and the user may indicate that the second lighting zone 106*b* should be activated if motion is detected by the motion sensor. The first lighting zone 106*a* may be activated at dusk or at a set point in time (e.g., 6 pm) and the third lighting zone 106*c* may be configured to be activated only on weekends at 6 pm or when specifically requested by the user (e.g. on demand). Other types of lighting commands may be received as well, e.g., preprogrammed lighting schedules or the like.

In operation 136, the bypass controllers 104*a*, 104*b*, 104*c* may then activate the lights 108 within their selective lighting zones 106*a*, 106*b*, 106*c* based on the commands. For example, the power controller 102 may be selected to continuously provide power via the power wire 110 (e.g., always on) and the bypass controllers 104*a*, 104*b*, 104*c* may then activate an internal switch to provide power to the bypass wire 112*a*, 112*b* or to the power wire 110 connected to the lights 108 based on the activation commands. When the activation command indicates that the lights 108 for a particular lighting zone 106*a*, 106*b*, 106*c* should be activated, the bypass controller 104*a*, 104*b*, 104*c* may provide power to the power wire 110 connected to the lights 108 and thus the lights 108 may generate light. When the activation command indicates that at least one of the lighting zones 106*a*, 106*b*, 106*b* should be deactivated, the corresponding bypass controller 104*a*, 104*b*, 104*c* may activate the switch to provide power to the corresponding bypass wire 112*a*, 112*b* that extend between the bypass controllers 104*a*, 104*b*, 104*c*. As discussed above, any one or all of the lighting zones 106*a*, 106*b*, 106*b* may be activated or deactivated at any point in time.

CONCLUSION

The methods and systems are described herein with reference to outdoor lighting systems. However, these techniques are equally applicable to other types of lighting or other electrically powered systems. As such, the discussion of any particular embodiment is meant as illustrative only. Further, features and modules from various embodiments may be substituted freely between other embodiments.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A method of activating a landscape lighting system comprising:

grouping a plurality of landscape lights into a first lighting zone having at least two landscape lights and a second lighting zone having at least two landscape lights, wherein the first lighting zone is electrically coupled to a power controller via a first power wire and the second lighting zone is electrically coupled to the power controller via a second power wire;

coupling the second lighting zone to a bypass controller via a bypass wire, wherein the bypass wire is electrically coupled to the power controller and is electrically parallel to the first power wire, wherein the two or more lighting zones are configured to be actuated together or separately; and activating at least one of the two or more lighting zones via the bypass controller.

2. The method of claim 1, wherein the bypass controller comprises a communication module and is configured to receive user instructions and in response to the user instructions, the bypass controller is configured to activate or deactivate the at least one of the two or more lighting zones.

3. The method of claim 1, wherein the bypass controller is in communication with a sensor and is configured to activate the at least one of the two or more lighting zones based on sensor data received from the sensor.

4. The method of claim 1, wherein the plurality of landscape lights grouped into the first lighting zone are electrically coupled between the power controller and the plurality of landscape lights grouped into the second lighting zone.

5. The method of claim 4, wherein activating at least one of the first lighting zone or the second lighting zone via the bypass controller includes activating the first lighting zone.

6. The method of claim 5, wherein the second lighting zone is not activated.

7. The method of claim 4, wherein the bypass controller is a first bypass controller and activating at least one of the first lighting zone or the second lighting zone via the bypass controller includes activating the second lighting zone via a second bypass controller electrically coupled to the first bypass controller via the bypass wire.

8. The method of claim 7, wherein the first lighting zone is not activated.

9. The method of claim 1, wherein the bypass controller is coupled to the power controller via the power wire and the bypass controller is positioned between the power controller and the first lighting zone.

10. The method of claim 9, wherein:

the bypass controller is a first bypass controller;

the power controller is coupled to a second bypass controller via the second power wire;

the second bypass controller is coupled to the first bypass controller via a second bypass wire; and the second bypass controller is positioned between the first lighting zone of the two or more lighting zones and the second lighting zone of the two or more lighting zones.

11. A system for activating a plurality of outdoor lights comprising:

a power controller electrically coupled to a power source and to the plurality of outdoor lights via a first power path and a bypass path that are electrically parallel to each other; and a bypass controller coupled between the plurality of outdoor lights and the power controller.

12. The system of claim 11, wherein:

each outdoor light of the plurality of outdoor lights is coupled in series with the power controller and with each other; and the bypass controller is configured to selectively activate portions of the plurality of outdoor lights.

13. The system of claim 12, wherein the bypass controller is configured to selectively activate a first portion of the plurality of outdoor lights that is downstream a second portion of the plurality of outdoor lights via the bypass wire.

14. The system of claim 11, further comprising a sensor in communication with the bypass controller, wherein the bypass controller is configured to activate at least one outdoor light of the plurality of outdoor lights based on sensor data received from the sensor.

15. The system of claim 11, wherein the bypass controller is a first bypass controller and comprises an identifier corresponding to a first lighting zone including a first portion of the plurality of outdoor lights, and the system further comprises:

a second bypass controller comprising an identifier corresponding to a second lighting zone including a second portion of the plurality of outdoor lights.

16. The system of claim 15, wherein:

the first bypass controller and the second bypass controller each comprise a communication module;

the first bypass controller is configured to receive user instructions and in response to the user instructions, the first bypass controller is configured to activate or deactivate the first lighting zone; and the second bypass controller is configured to receive user instructions and in response to the user instructions, the second bypass controller is configured to activate or deactivate the second lighting zone.

17. A landscape lighting system comprising:

a first lighting zone including a first landscape light;

a second lighting zone including a second landscape light;

a power controller electrically coupled to the first landscape light and the second landscape light via a power wire, wherein the first landscape light is coupled with the second landscape light in series via the power wire;

a first bypass controller coupled to the power wire between the power controller and the first lighting zone; and a second bypass controller coupled to the power wire between the first lighting zone and the second lighting zone, wherein the first bypass controller is coupled with the second bypass controller via a bypass wire electrically parallel to the power wire.

18. The landscape lighting system of claim 17, wherein:

the first bypass controller is configured to provide power from the power controller to the second bypass controller via the bypass wire; and the second bypass controller is configured to provide the power from the first bypass controller to the second landscape light.

19. The landscape lighting system of claim 18, wherein the power from the power controller is not provided to the first landscape light via the power wire.

20. The landscape lighting system of claim 17, wherein:

the first bypass controller comprises a communication module and is configured to receive user instructions and in response to the user instructions, the first bypass controller is configured to activate or deactivate the first landscape light; and the second bypass controller is in communication with a sensor and is configured to activate the second landscape light based on sensor data received from the sensor.

* * * * *